United States Patent
Säily et al.

(10) Patent No.: US 12,457,492 B2
(45) Date of Patent: Oct. 28, 2025

(54) CRYPTOGRAPHIC PROCESS

(71) Applicant: Nokia Technologies Oy, Espoo (FI)

(72) Inventors: Mikko Säily, Espoo (FI); Risto Ilari Wichman, Helsinki (FI); Mehmet Cagri Ilter, Espoo (FI); Alexis Dowhuszko, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 132 days.

(21) Appl. No.: 18/510,023

(22) Filed: Nov. 15, 2023

(65) Prior Publication Data
US 2024/0196207 A1    Jun. 13, 2024

(30) Foreign Application Priority Data
Dec. 8, 2022 (FI) .......................... 20226083

(51) Int. Cl.
*H04W 12/03*    (2021.01)
*H04W 12/041*    (2021.01)

(52) U.S. Cl.
CPC ......... *H04W 12/03* (2021.01); *H04W 12/041* (2021.01)

(58) Field of Classification Search
CPC .... H04W 12/03; H04W 12/041; H04L 9/001; H04L 2209/80; H04L 9/0872; H04L 9/0875
See application file for complete search history.

(56) References Cited

U.S. PATENT DOCUMENTS 7,293,176 B2 * 11/2007 Otway .................. H04L 9/321
                                                        713/168
8,855,303 B1 * 10/2014 Glatfelter ............. H04L 9/0861
                                                        726/36
(Continued)

FOREIGN PATENT DOCUMENTS

AU    2021104458 A4    11/2021
CN    108365951 A    8/2018
(Continued)

OTHER PUBLICATIONS

Extended European Search Report received for corresponding European Patent Application No. 23210479.4, dated Jan. 30, 2024, 8 pages.
(Continued)

*Primary Examiner* — Abu S Sholeman
(74) *Attorney, Agent, or Firm* — Carter, DeLuca & Farrell LLP

(57) ABSTRACT

According to an example aspect of the present invention, there is provided an apparatus configured to determine a first channel definition describing a first wireless communication channel between the apparatus and a second apparatus, the first wireless communication channel being on a first frequency band, determine a second channel definition describing a second wireless communication channel between the apparatus and the second apparatus, the second wireless communication channel being on a second frequency band which has a lower bound at a higher frequency than an upper bound of the first frequency band, and derive an encryption key at least partly based on the second channel definition, and use the encryption key to encrypt information before it is transmitted to the second apparatus over the first wireless communication channel.

1 Claim, 5 Drawing Sheets

(56) References Cited

U.S. PATENT DOCUMENTS

| | | | |
|---|---|---|---|
| 9,313,002 B1* | 4/2016 | Balraj | H04W 72/541 |
| 2003/0093663 A1* | 5/2003 | Walker | H04L 9/3271 |
| | | | 713/150 |
| 2005/0144459 A1* | 6/2005 | Qureshi | H04L 63/083 |
| | | | 713/176 |
| 2009/0103722 A1* | 4/2009 | Anderson | H04L 9/0841 |
| | | | 713/171 |
| 2009/0280774 A1* | 11/2009 | Patel | H04W 12/08 |
| | | | 455/410 |
| 2013/0156181 A1 | 6/2013 | Baek et al. | |
| 2013/0182846 A1* | 7/2013 | Yamada | H04W 12/02 |
| | | | 380/270 |
| 2014/0219449 A1 | 8/2014 | Shattil et al. | |
| 2016/0156626 A1* | 6/2016 | Roth | H04L 63/123 |
| | | | 713/169 |
| 2017/0310665 A1* | 10/2017 | Revell | H04L 9/0869 |
| 2018/0373892 A1* | 12/2018 | Orner | H04L 9/0819 |
| 2021/0092593 A1 | 3/2021 | Yunusov et al. | |
| 2021/0099295 A1* | 4/2021 | Li | H04L 9/3226 |
| 2021/0345102 A1* | 11/2021 | Win | H04W 12/03 |
| 2021/0368338 A1 | 11/2021 | Lord et al. | |
| 2022/0022210 A1* | 1/2022 | Park | H04W 72/566 |
| 2022/0150063 A2 | 5/2022 | Ramabadran et al. | |

FOREIGN PATENT DOCUMENTS

| | | |
|---|---|---|
| CN | 111464299 A | 7/2020 |
| CN | 111669730 A | 9/2020 |
| CN | 112533199 A | 3/2021 |
| CN | 114374511 A | 4/2022 |
| CN | 114584292 A | 6/2022 |
| CN | 114598467 A | 6/2022 |
| CN | 114629626 A | 6/2022 |
| CN | 114745715 A | 7/2022 |
| EP | 3796584 A1 | 3/2021 |
| WO | 2021/063518 A1 | 4/2021 |
| WO | 2021/096433 A1 | 5/2021 |
| WO | 2021/154106 A1 | 8/2021 |
| WO | 2021/246281 A1 | 12/2021 |
| WO | 2022/146365 A1 | 7/2022 |
| ZA | 202206682 A | 8/2022 |

OTHER PUBLICATIONS

Notice of Allowance received for corresponding European Patent Application No. 23210479.4, dated Apr. 15, 2025, 7 pages.

Manjappa et al., "Real-time Physical Layer Secure Key Generation in a mmWave Communication System", 17th International Symposium on Wireless Communication Systems (ISWCS), Sep. 6-9, 2021, 6 pages.

All et al., "Early warning of mmWave signal blockage and AoA transition using sub-6 GHz observations", IEEE Communications Letters, vol. 24, No. 1, Jan. 2020, pp. 207-211.

Anjinappa et al., "Angular and temporal correlation of V2X channels across sub-6 GHz and mmWave bands", IEEE International Conference on Communications Workshops (ICC Workshops), May 20-24, 2018, 6 pages.

Sim et al., "Deep learning-based mmWave beam selection for 5G NR/6G with sub-6 GHz channel information: Algorithms and prototype validation", IEEE Access, vol. 8, Mar. 12, 2020, pp. 51634-51646.

U.S. Appl. No. 16/495,981, "Method and Apparatus for Coordinating Terminal Capabilities for LTE/NR Interworking in Wireless Communication System", filed on Sep. 20, 2019, pp. 1-19.

"RRM Open Issues", 3GPP TSG-RAN WG2 Meeting #109bis electronic, R2-200xxxx, Agenda: 6.11.6, CATT, Apr. 20-24, 2020, pp. 1-5.

"Embracing Open Ecosystem", China Mobile, Sep. 9, 2020, 22 pages.

Zhang et al., "Deep Learning-based Physical-Layer Secret Key Generation for FDD Systems", arXiv, Aug. 31, 2021, pp. 1-14.

Wan et al., "Secret Key Generation Scheme Based on Deep Learning in FDD MIMO Systems", IEICE Transactions on Information and Systems, vol. E104-D, No. 7, Jul. 2021, pp. 1058-1062.

Zoli et al., "Physical-Layer-Security Box: a concept for time-frequency channel-reciprocity key generation", EURASIP Journal on Wireless Communications and Networking, vol. Article No. 114, 2020, pp. 1-24.

Office action received for corresponding Finnish Patent Application No. 20226083, dated Jun. 16, 2023, 15 pages.

"Enabling Deep Learning-based Physical-layer Secret Key Generation for FDD-OFDM Systems in Multi-Environments", arXiv, Nov. 6, 2022, pp. 1-13.

* cited by examiner

CRYPTOGRAPHIC PROCESS

RELATED APPLICATION

This application claims priority from, and the benefit of, Finnish Application No. 20226083, filed on Dec. 8, 2022, the contents of which is incorporated herein by reference in its entirety.

FIELD

The present disclosure related to generation of cryptographic information, such as encryption key material, for example by using characteristics of a wireless communication channel.

BACKGROUND

When establishing cryptographically secured, that is, encrypted, communications between two parties, it is necessary to arrange for the parties to share an encryption key in case symmetric encryption is used. In symmetric encryption, the same key is used for both encrypting and decrypting, whereas in public-key encryption, a public key is used for encrypting and an associated private key is used for decrypting. As the public key may be sent over an unsecured channel, establishing secured communications using public key encryption is easy, albeit public-key based cryptosystems are computationally more intensive than symmetric-key cryptosystems.

In general, a shared secret known to both parties may be used as a symmetric encryption key, or in deriving a symmetric encryption key. Such a shared secret may be established using out-of-band communications, such as a courier, or by using a cryptographic key exchange over a non-trusted communication channel. A Diffie-Hellman key exchange is an example of a cryptographic key exchange which may be used to establish a shared secret between two parties over a non-trusted communication channel.

SUMMARY

According to some aspects, there is provided the subject-matter of the independent claims. Some embodiments are defined in the dependent claims. The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to a first aspect of the present disclosure, there is provided an apparatus comprising at least one processing core and at least one memory storing instructions that, when executed by the at least one processing core, cause the apparatus at least to determine a first channel definition describing a first wireless communication channel between the apparatus and a second apparatus, the first wireless communication channel being on a first frequency band, determine a second channel definition describing a second wireless communication channel between the apparatus and the second apparatus, the second wireless communication channel being on a second frequency band which has a lower bound at a higher frequency than an upper bound of the first frequency band, and derive an encryption key at least partly based on the second channel definition, and use the encryption key to encrypt information before it is transmitted to the second apparatus over the first wireless communication channel.

According to a second aspect of the present disclosure, there is provided a method comprising determining, in an apparatus, a first channel definition describing a first wireless communication channel between the apparatus and a second apparatus, the first wireless communication channel being on a first frequency band, determining a second channel definition describing a second wireless communication channel between the apparatus and the second apparatus, the second wireless communication channel being on a second frequency band which has a lower bound at a higher frequency than an upper bound of the first frequency band, and deriving an encryption key at least partly based on the second channel definition, and using the encryption key to encrypt information before it is transmitted to the second apparatus over the first wireless communication channel.

According to a third aspect of the present disclosure, there is provided an apparatus comprising means for determining, in the apparatus, a first channel definition describing a first wireless communication channel between the apparatus and a second apparatus, the first wireless communication channel being on a first frequency band, means for determining a second channel definition describing a second wireless communication channel between the apparatus and the second apparatus, the second wireless communication channel being on a second frequency band which has a lower bound at a higher frequency than an upper bound of the first frequency band, and means for deriving an encryption key at least partly based on the second channel definition, and for using the encryption key to encrypt information before it is transmitted to the second apparatus over the first wireless communication channel.

According to a fourth aspect of the present disclosure, there is provided a non-transitory computer readable medium having stored thereon a set of computer readable instructions that, when executed by at least one processor, cause an apparatus to at least determine a first channel definition describing a first wireless communication channel between the apparatus and a second apparatus, the first wireless communication channel being on a first frequency band, determine a second channel definition describing a second wireless communication channel between the apparatus and the second apparatus, the second wireless communication channel being on a second frequency band which has a lower bound at a higher frequency than an upper bound of the first frequency band, and derive an encryption key at least partly based on the second channel definition, and use the encryption key to encrypt information before it is transmitted to the second apparatus over the first wireless communication channel.

According to a fifth aspect of the present disclosure, there is provided a computer program comprising instructions which, when executed by an apparatus, cause the apparatus to perform at least the following: determine a first channel definition describing a first wireless communication channel between the apparatus and a second apparatus, the first wireless communication being on a first frequency band, determine a second channel definition describing a second wireless communication channel between the apparatus and the second apparatus, the second wireless communication being on a second frequency band which has a lower bound at a higher frequency than an upper bound of the first frequency band, and derive an encryption key at least partly based on the second channel definition, and use the encryption key to encrypt information before it is transmitted to the second apparatus over the first wireless communication channel.

According to a sixth aspect of the present disclosure, there is provided an apparatus comprising at least one processing core and at least one memory storing instructions that, when executed by the at least one processing core, cause the apparatus at least to determine a first channel definition describing a first wireless communication channel between the apparatus and a second apparatus, the first wireless communication channel being on a first frequency band, determine a second channel definition describing a second wireless communication channel between the apparatus and the second apparatus, the second wireless communication channel being on a second frequency band which has a lower bound at a higher frequency than an upper bound of the first frequency band, and derive a cryptographic key at least partly based on the second channel definition, and use the cryptographic key to decrypt information after it is received from the second apparatus over the first wireless communication channel.

EMBODIMENTS

Methods are described herein which employ wireless communication channel definition information to derive a shared secret between communication parties. In particular, channel definition information of a wireless communication channel other than one used in communication may be employed. The channel definition information may comprise a channel frequency response, for example, or a channel impulse response, or a parameter related to, or derivable from a model of said channels. For example, a channel definition may be measured concerning a wireless communication channel in a first frequency band and a channel definition may be obtained concerning a wireless communication channel on a second frequency band. The channel definition on the second frequency band may be either measured, or it may be calculated using information on correlation between communication channels on the first and second frequency bands. The channel definition obtained on the second frequency band may then be used as keying material, or to generate the keying material, optionally together with the channel information on the first frequency band. This provides a benefit in terms of communication security, as the first and second frequency bands differ in frequency, and the keying material obtained using the channel definition of the second frequency band, which is on a higher frequency, enhances the randomness, or security, of the keying material as it relates to a location of the user equipment device. It is noted that the term randomness is used herein as a description of information that at least appears to exhibit random-like properties. Thus random may be, in practice, pseudo-random. Wireless communication channels on a higher frequency vary faster as a function of place than do channels on lower frequencies. In addition, a potential eavesdropper would need to know the characteristics of the higher frequency channel to compromise security of the herein disclosed system. If that information is agreed only between the intended transmitter and receivers, an additional layer of security results.

Figure 1:
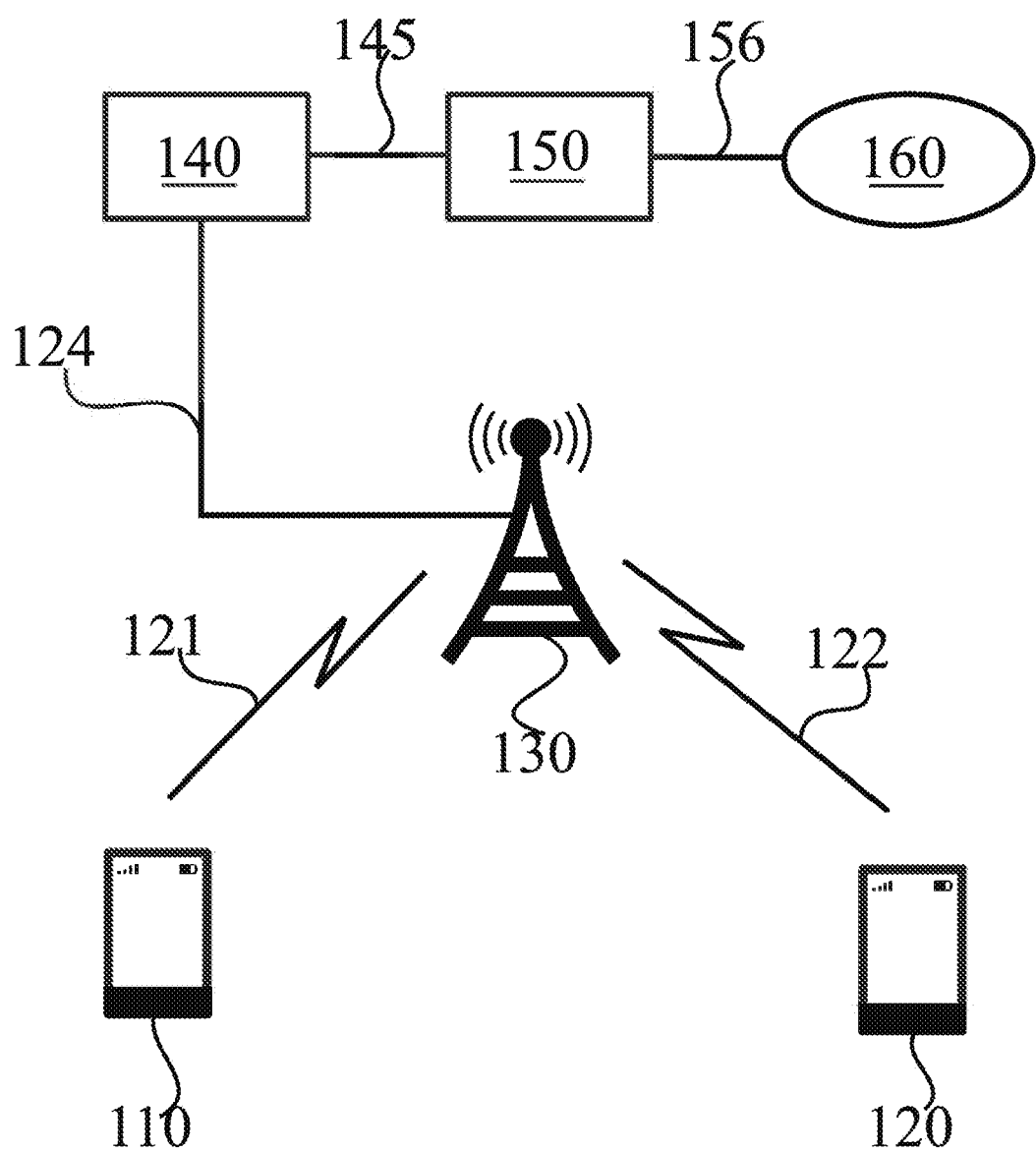
FIG. 1 illustrates an example system in accordance with at least some embodiments of the present invention.

FIG. 1 illustrates an example system in accordance with at least some embodiments of the present invention. The example of FIG. 1 is a cellular system, but the herein disclosed methods are not limited to being applied in a cellular context. FIG. 1 illustrates a base station 130, which is configured to operate in accordance with a cellular communication standard, such as long term evolution, LTE, or fifth generation, 5G, also known as New Radio, NR, both as specified by the $3^{rd}$ generation partnership project, 3GPP. Where a non-cellular system is used, an access node, such as access point, corresponding to base station 130 may be configured in accordance with a non-cellular communication standard such as wireless local area network, WLAN, or worldwide interoperability for microwave access, WiMAX, for example.

Base station 130 is coupled with a core network node 140 via link 124, which may comprise a wire-line connection, for example. Core network node 140 may comprise a mobility management entity, MME, a serving gateway, S-GW, or an access and mobility management function, AMF, for example. The core network may comprise a gateway 150, connected to core network node 140 via link 145. Gateway 150 enables communication with further networks 160, via inter-network link 156. In non-cellular systems, core network node 150 and gateway 150 may be absent, with the access node corresponding to base station 130 being directly connected to further networks, for example. Link 145 and inter-network link 156 may be wire-line links, for example.

Further, in the illustrated example situation, base station 130 is in wireless radio communication with user equipments, UEs 110 and 120. Each UE may comprise, for example, a smartphone, feature phone, tablet or laptop computer, Internet-of-Things, IoT, node, smart wearable or a connected car connectivity module, for example. Naturally, separate UEs need not be of a same type. Wireless communication channel 121 connects base station 130 with UE 110, and wireless communication channel 122 connects base station 130 with UE 120.

Radio communication between UEs and their serving base station may be encrypted to enhance privacy of communicated information. Where a multi-layer protocol stack is used, different layers of the stack may use different encryption mechanisms. In general, a physical layer is the lowest layer in a protocol stack. Data encrypted in a physical layer encryption mechanism may be decrypted in the base station and UE, respectively, for uplink and downlink communication. In some cases, separate application-layer encryption may be used on top of, and in addition to, physical-layer encryption to obtain end-to-end encryption between communication endpoints.

Encryption mechanisms for the physical layer benefit from being quick and light-weight to implement, since the physical layer needs to be established every time communications are initialized from a UE toward the network. For example some IoT-type UEs may transmit only short packets, wherefore a complex key agreement protocol would add, in relative terms, a lot of overhead, reducing also the energy efficiency of the communication.

Physical-layer key generation, PKG, establishes cryptographic keys from highly correlated measurements of wireless channels, which relies on reciprocal channel characteristics between the uplink and downlink—or similarly between any two communication parties, including sidelink or direct device-to-device communication. Within PKG, secure key generation may depend on three principles: channel reciprocity, spatial decorrelation and temporal variations. Channel reciprocity indicates that the same, or similar, channel characteristics can be observed at both ends of the same communication channel, which forms the basis for generating cryptographic keying material for encryption key generation. In case of bidirectional communication, for time-division duplexing, TDD, systems, both the uplink and downlink are in the same carrier frequency band, and the channel responses obtained by a base station and a UE are reciprocal, generating the same or similar channel definition information. However, for frequency division duplexing, FDD, systems, the uplink and downlink transmit using different carrier frequencies, and the uplink and downlink experience dis-identical fading behaviour. Key generation for these FDD-based systems will provide information-theoretically secure keys for them, and hence it is preferable. Examples of FDD key generation mechanisms are described in [1] and [2]. In FDD, it should also be recognized that the UE and base station need not determine exactly the same channel in detail, and long as they determine the same channel definition information, which may be coarser in nature than the specific channel estimation result. For example, the obstacles and distance are the same in UL and DL, even if the used frequency may differ somewhat, enabling determination of sufficiently similar channel definition information, that a shared secret may be achieved based on it.

Figure 2:
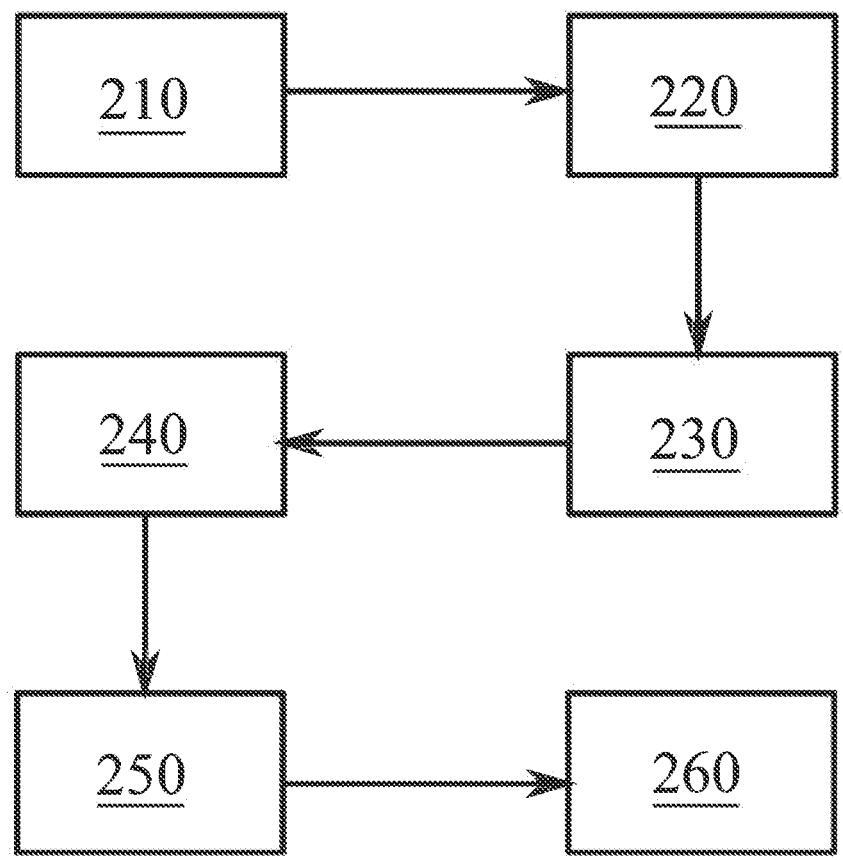
FIG. 2 illustrates an example process in accordance with at least some embodiments of the present invention.

Herein are described methods for key generation where the inherent randomness of fading wireless radio channels between two parties is utilized in a novel way to generate keys. FIG. 2 illustrates phases of a process of generating cryptographic keying material for encryption key derivation.

FIG. 2 illustrates an example process in accordance with at least some embodiments of the present invention. In the process of FIG. 2, initially, in phase 210, channel probing is performed to measure a channel definition of a wireless communication channel. Then, phase 220, randomness is extracted from results of the channel probing of phase 210. After phase 220, the process advances to phase 230, where channel probing results of a wireless communication channel on a second frequency band, different and of a higher frequency range than that used in phase 210, are obtained and randomness is extracted from these results. In optional phase 240, quantization is applied to the output of phase 230, and in phase 250 the obtained cryptographic keying material is formatted for input to phase 260. In phase 260, at least one encryption key is derived from the keying material. The second frequency band may have a lower bound at a higher frequency than an upper bound of the first frequency band. In other words, the lowest-frequency end of the second frequency band may be a higher frequency than a highest-frequency end of the first frequency band.

Key derivation may rely on exploiting channel definition similarities between a first and a second frequency band. The first and second frequency bands may be, for example, on frequency range 1, FR1, and frequency range 2, FR2, respectively, as defined by 3GPP. Therein FR1 is defined as under 6 GHZ, and FR2 is defined as being of at least 24 GHz. In general a frequency of a second wireless communication channel, used in addition to a first wireless communication channel, may have a centre frequency of at least two, three or four times the centre frequency of the first wireless communication channel.

As noted above, a channel definition of a wireless communication channel may comprise a channel frequency response or a channel impulse response, for example. A frequency response of a channel spans the same bandwidth as the stimulus signal measured on the wireless communication channel to determine the frequency response, and the frequency response is a discrete fourier transform of the channel impulse response. The impulse response is the response of the wireless communication channel to a brief input signal, revealing e.g. reflections in the channel. It is noted that other definitions of channel are also viable. For example, a channel may be defined also as a mixture of its temporal and frequency domain characteristics. Mappings may exist between different channel definitions, for example, it may be possible to obtain a second channel definition from a first channel definition using a suitable mapping. For example, time of arrival, ToA, of the second channel definition may be obtained from ToA of the first channel definition. A channel impulse response of a second channel definition may, in some embodiments, be calculated from a first channel definition channel impulse response using a mapping. For example, the mapping may comprise a correlation function, employ location-based information, and/or be a location-specific mapping function which enables an accurate obtaining of the second channel definition information from the first channel definition information.

In terms of FIG. 1, two UEs, 110 and 120, are located in two different locations and a base station, or access node, covers both locations using a transmission on the first frequency band, which may lie in FR1, for example. The lower location correlation of the higher-frequency second frequency band, which may lie in FR2, for example, is used in both locations to generate two different keys in each UE for its physical layer encryption.

The herein described process leverages the assumption that base station 130 and UEs can, or could, work with both the first and the second frequency band, for example on FR1 and FR2, as described above. Initially, UEs 110 and 120 receive data packets over wireless communication channels 121 and 122, respectively, on the first frequency band. In this phase, channel estimation procedures are performed by the UEs on the first frequency band to derive channel definitions. Based on the distance between UEs 110 and 120, the degree of similarity in channel definition data varies. In general lower frequencies are associated with longer wavelengths, wherefore the channel changes slower as a function of location than with channels on higher frequencies. For encryption key derivation, channel definition information obtained from the first frequency band may be converted into channel definition information of the second frequency band by exploiting a previously determined spatial/time correlation function between wireless communication channels on the first and second frequency bands at each terminal location. An encryption key, for example for use on the physical layer of a protocol stack, may be obtained from the channel definition information of a wireless communication channel on the second frequency band. In comparison with channel definition information of wireless communication channels on the first frequency band, channels definition information of wireless communication channels on the second frequency band exhibits less spatial correlation with respect to different locations due to its higher frequency, wherefore it is almost certain to have significantly different derived encryption keys in each UE.

Alternatively to converting the channel definition information from the first frequency band to the second frequency band using the previously determined correlation, the UEs may be configured to measure the channel definition information on the second frequency band. To enable this, the base station may be configured to transmit a signal on the second frequency band for the UE to measure.

In general, in 3GPP networks FR1 links are used for coverage and cell-edge scenarios, whereas FR2 is more preferable for high-capacity deployments and load balancing purposes. From this perspective, different priorities may be assigned to each frequency range, and UEs may carry out radio resource management, RRM, measurements when there is a measurement gap for other frequencies.

It has been observed that there exists high correlation in key multipath statistics between FR1 and FR2, such that angle of arrival, direction of arrival, time of arrival and angle of departure in both line-of-sight and non-line-of-sight scenarios [3]. This correlation has been used for optimal transmit/receive beam-pair selection in configuration of FR2 links and base station discovery. Further, a deep learning-based approach for beam selection was proposed in [4] where sub-6 GHz link information is utilized in a deep-learning artificial neural network, enabling a reduction in beam sweeping overhead by 79.3%. In most frameworks, however, FR1 and FR2 connections are considered separate, standalone solutions. These documents thus describe ways of determining the correlation between channel definitions of wireless communication channels on different frequency bands. In other words, these documents describe ways of exploiting the features of different wireless communications on different frequency bands for generating cryptographic keys. In at least some embodiments of the present disclosure, availability of multiple communication channels is utilized for providing encryption between two communication parties. The encryption may be obtained in transition between time, frequency and location-based features of two different communication channels To derive the encryption key, for example for the physical layer, UEs 110 and 120 of FIG. 1 estimate their respective channel definitions, such as channel state information, CSI, or channel frequency response, from receiving data frames from base station 130 via respective first communication channels on the first frequency band, which is on a lower frequency than the second frequency band. If a network controller transmits a signal x(t) to UEs 110 and 120 on the first frequency band, the received signals Y at these UEs may be defined, respectively, as:

$$Y_{110} = H_{110,1} X(f) + W_{110}(f)$$

$$Y_{120} = H_{120,1} X(f) + W_{120}(f)$$

where $H_{110,1}(f)$ and $H_{120,1}(f)$ denote the respective channel frequency responses, and $W_{110}$ and $W_{120}$ are the respective zero-mean additive white Gaussian noises, AWGN. The channel frequency responses, $H_{110,1}$ and $H_{120,1}$, are estimated in the respective UEs by decoding a signal field of the received packets. Once the channel estimation procedure is completed for $H_{110,1}$ at UE 110, $\hat{H}_{110,1}$ may be obtained. Then based on the mapping capability/availability at UE 110, UE 110 can generate $\hat{H}_{110,2}$. For example, a mapping capability based on a correlation between $H_{110,1}$ and $H_{120,1}$ may yield the following relation between $\hat{H}_{110,2}$ and $\hat{H}_{110,1}$:

$$\hat{H}_{110,2} = f(\hat{H}_{110,1}).$$

Herein f(•) is the known or learned mapping function between the wireless communication channels, more specifically the channel definitions of the communication channels, at UE 110. Then, UE 110 may follow the key generation procedure given in FIG. 2. A similar procedure can be followed in UE 120, after estimating $\hat{H}_{120,1}$. UE 120 can either utilize generate a channel definition on the second frequency band based on its own correlation, such that $$\hat{H}_{120,2} = g(\hat{H}_{120,1}).$$

Note that in the context of higher frequencies, in general f(•) and g(•) are different functions since UEs 110 and 120 are located at a distance greater than the coherence distance of wireless communication channels on the second frequency band, e.g. FR2. In other words, each UE may select a function, such as f(•) or g(•), based on its location. To this end, each UE may store a plurality of functions and a mapping from a set of UE locations to the set of functions, to enable selecting the correct function for the current UE location. The UE may obtain the functions by storing them based on its earlier measurements while moving about, and/or the UE may receive such functions from other network elements. For example, UEs moving in a coverage area of a cell may determine the functions and report them to a base station controlling the cell, and the base station may then share the function(s) to other UEs as they enter the cell, and/or based on need, for example based on where in the cell the other UE(s) happen to be. In some cases, instead of using a function, the UE may have previously stored information which defines the channel definition information for the second-frequency band channel. The base station may be used to share such channel definition information between UEs as is described above for the functions. Then, UE 120 may follow the key derivation procedures given in FIG. 2, where the second-frequency band channel definition information is utilized.

Then UE 110 can transmit its signal back to base station 130, or another device, after deriving an encryption key from $\hat{H}_{110,2}$ and UE 120 should not be successful in obtaining this secret key due to the decorrelated wireless communication channels in the second frequency band.

The herein described encryption key derivation mechanism provides several advantages. In detail, cases are addressed where the channel coherence time is short such that reciprocity between uplink and downlink is weak. That is, when base station 130 cannot apply precoding to the transmitted signal based on uplink channel estimates. In cases where the eavesdropper is co-located, or almost so, with UE 110 or UE 120, he will observe the channel measurements that are highly correlated, such that the communication is vulnerable to attacks. By using the proposed mechanism, utilizing the higher-frequency second frequency band can produce different keys due to narrower spatial correlation.

A further advantage lies in static devices. Many IoT devices, such as unattended devices, may be stationary and the wireless communication channel randomness is limited for this reason. From this aspect, generating the key by utilizing the higher-frequency second frequency band can produce different keys due to narrower spatial correlation.

The herein disclosed method is also suitable for devices that likely cannot support a full encryption key-based security protocol, such as one knows from current 3GPP standards. Such devices may include passive IoT energy-harvesting devices that may have very limited battery storage, or even no electrical energy storage at all. In such cases the physical layer security may be sufficient, or even the only option.

Figure 3:
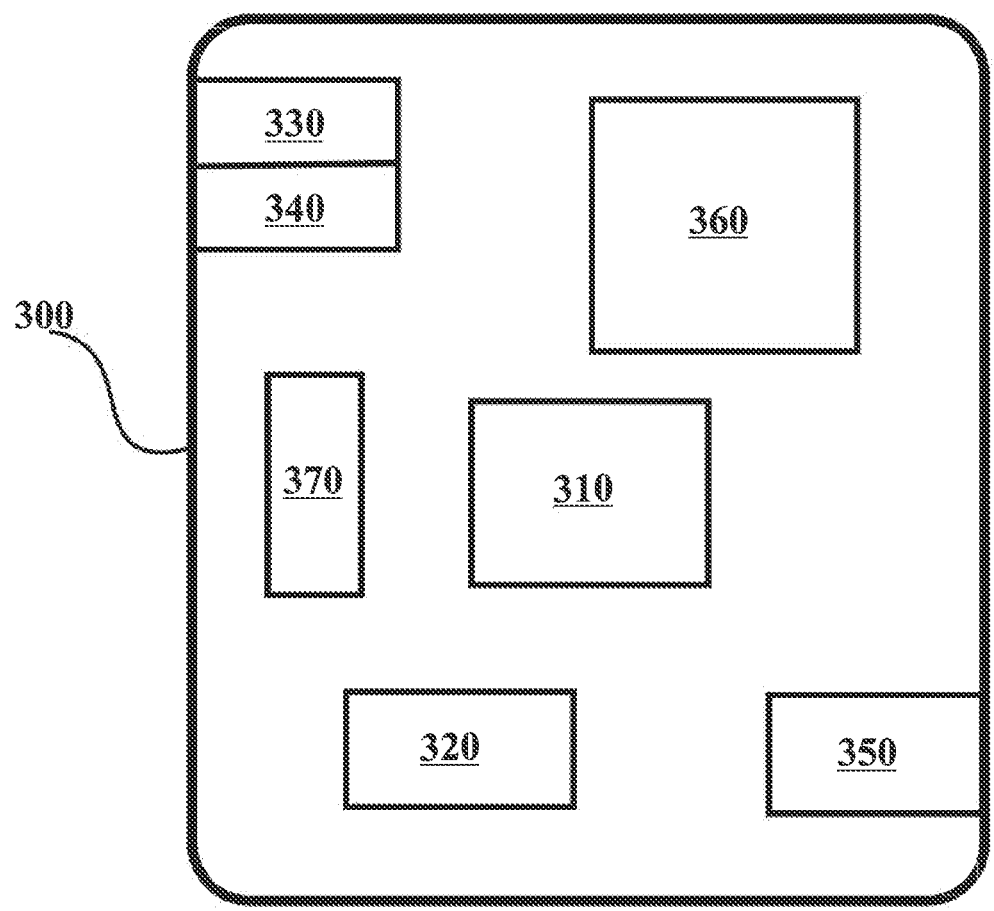
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a mobile communication device such as a UE or, in applicable parts, a base station of FIG. 1. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. When processor 310 comprises more than one processor, device 300 may be a distributed device wherein processing of tasks takes place in more than one physical unit. Processor 310 may be a control device. A processing core may comprise, for example, a Cortex-A8 processing core manufactured by ARM Holdings or a Zen processing core designed by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300, such as determining, deriving, using, communicating, encrypting and decrypting. Processor 310 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analogue and/or digital circuitry, and (b) combinations of hardware circuits and software, such as, as applicable: (i) a combination of analogue and/or digital hardware circuit(s) with software/firmware and (ii) any portions of hardware processor(s) with software (including digital signal processor(s)), software, and memory(ies) that work together to cause an apparatus, such as a mobile phone or base station, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300. Memory 320 may be non-transitory. The term "non-transitory", as used herein, is a limitation of the medium itself (that is, tangible, not a signal) as opposed to a limitation on data storage persistency (for example, RAM vs. ROM).

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
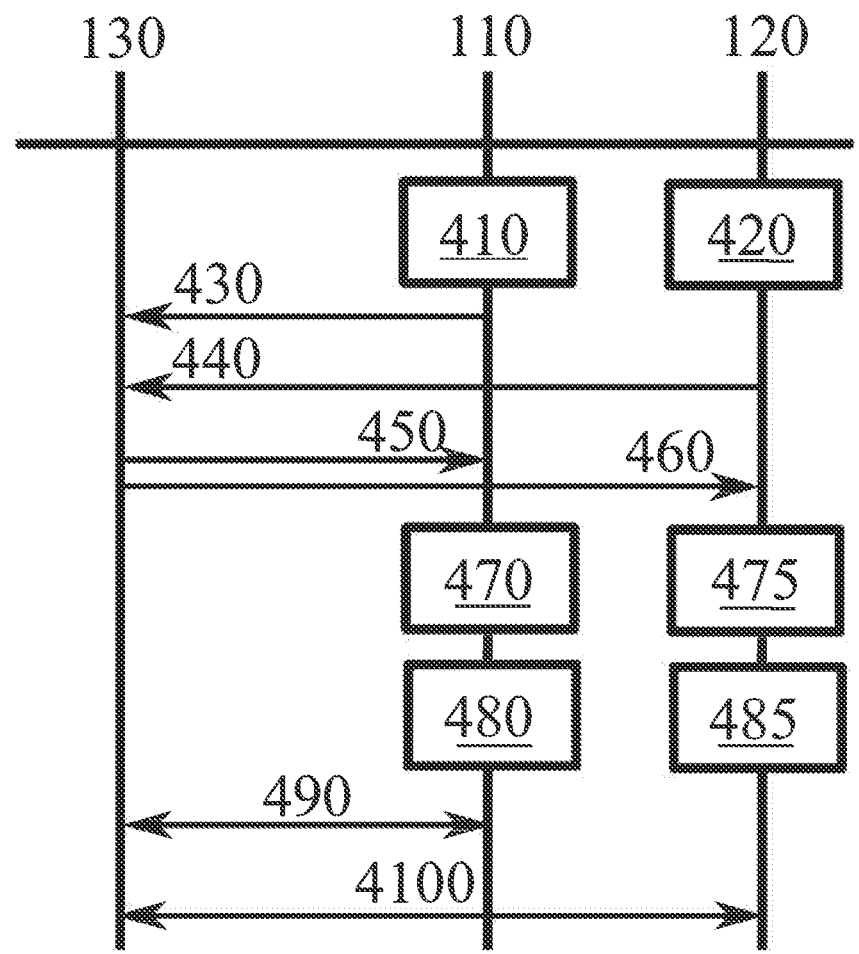
FIG. 4 illustrates signalling in accordance with at least some embodiments of the present invention.

FIG. 4 illustrates signalling in accordance with at least some embodiments of the present invention. On the vertical axes are disposed, from the left to the right, base station 130, UE 110 and UE 120 of FIG. 1. Time advances from the top toward the bottom.

In phases 410 and 420, respectively, UEs 110 and 120 determine to initiate connectivity toward the network. They transmit an initial message to base station 130 in phases 430 and 440, respectively, informing base station 130 of their intent to initiate connectivity.

To initialize physical-layer encryption between the UEs and base station 130, the UEs and base station 130 will use characteristics of wireless communication channels between the base station and each UE, separately. As the UEs are not in the same location, they will have distinct wireless communication channels connecting them to the base station.

In phase 450, UE 110 receives a signal, or signals, from base station 130. Likewise in phase 450, UE 120 receives a signal, or signals, from base station 130. The signal, or signals, received in the UEs may be the same ones, in case they are broadcasted from base station 130, or they may be separate signals addressed separately to the two UEs. In phase 470, UE 110 measures a channel definition of a wireless channel connecting it to base station 130, and in phase 475 UE 120 does the same with a wireless channel connecting UE 120 to base station 130. Thus both UEs will be in possession of channel definitions describing wireless communication channels they have with base station 130. As the communication channels are not the same, the channel definitions are not the same either, however if the UEs are close to each other, the channel definitions may have some similarities.

In phase 480, UE 110 derives channel definition information of a second wireless communication channel between itself and base station 130, the second wireless communication channel being on a frequency band that is higher than the frequency band used in phase 450. As described herein above, this may comprise measuring the channel definition information of the second wireless communication channel, or obtaining this channel definition by using a pre-determined correlation function and the channel definition measured in phase 470. In phase 485, UE 120 does likewise with its second wireless communication channel, either measuring the channel definition of the second wireless communication channel connecting UE 120 to base station 130 on the second frequency band, or deriving it using a pre-determined correlation function.

Both UEs use the channel definition of their respective wireless communication channels with base station 130 on the second frequency band to derive keying material and respective encryption keys. Since the second frequency band is on a higher frequency, the channel definitions on that frequency band resemble each other less than those on the first frequency band, resulting in keying material and encryption keys which exhibit higher randomness between the UEs, than in the case that only channel definitions regarding wireless communication channels on the first frequency band would have been used.

Finally, in phase 490 UE 110 communicates with base station 130 using a protocol stack, such that the encryption key derived in phase 480 using keying material obtained from the channel definition of the communication channel on the second frequency band is used. UE 120 does likewise in phase 4100, using the encryption key it derived in phase 485, using keying material obtained from the channel definition of the communication channel on the second frequency band is used.

Figure 5:
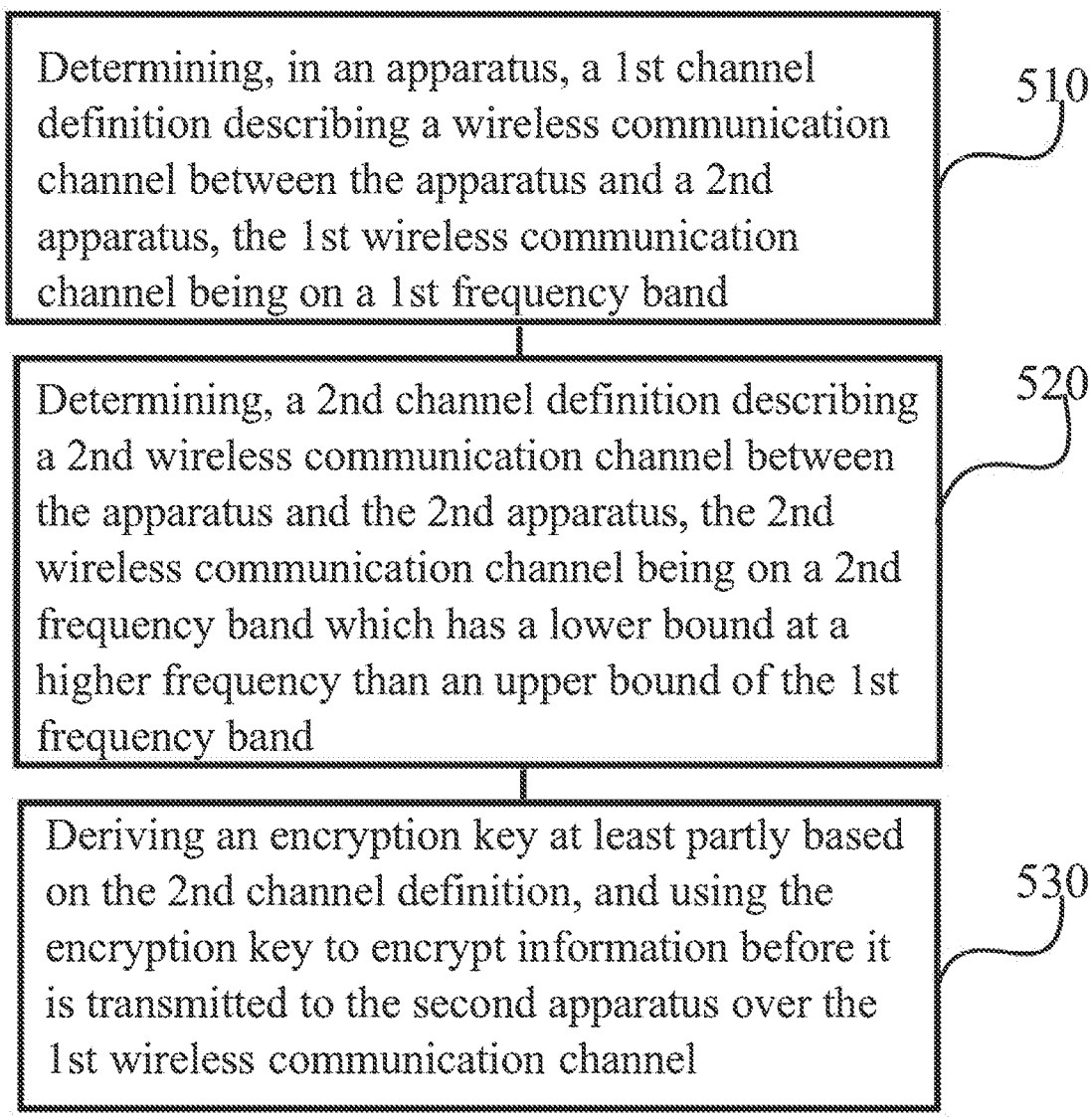
FIG. 5 is a flow graph of a method in accordance with at least some embodiments of the present invention.

FIG. 5 is a flow graph of a method in accordance with at least some embodiments of the present invention. The phases of the illustrated method may be performed in UE 110 or base station 130, for example, or in a control device configured to control the functioning thereof, when installed therein.

Phase 510 comprises determining, in an apparatus, a first channel definition describing a first wireless communication channel between the apparatus and a second apparatus, the first wireless communication channel being on a first frequency band. Phase 520 comprises determining a second channel definition describing a second wireless communication channel between the apparatus and the second apparatus, the second wireless communication channel being on a second frequency band which has a lower bound at a higher frequency than an upper bound of the first frequency band. Finally, phase 530 comprises deriving an encryption key at least partly based on the second channel definition, and using the encryption key to encrypt information before it is transmitted to the second apparatus over the first wireless communication channel. Also the first channel definition may be used in the deriving of the encryption key. The upper bound of the first frequency band may be six gigahertz while the lower bound of the second frequency band may be twenty-four gigahertz.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in securing wireless communications.

ACRONYMS LIST

3GPP 3$^{rd}$ generation partnership project
5G fifth generation
AMF access and mobility management function
FDD frequency division duplex
FR1 frequency range 1
FR2 frequency range 2
LTE long term evolution
MME mobility management entity
NR new radio
PKG physical-layer key generation
S-GW serving gateway
TDD time-division duples UE user equipment
WCDMA wideband code division multiple access
WiMAX worldwide interoperability for microwave access
WLAN wireless local area network

REFERENCE SIGNS LIST

| | |
|---|---|
| 110, 120 | user equipment |
| 130 | base station |
| 140 | core network node |
| 150 | gateway |
| 160 | further network |
| 124, 145 | link |
| 156 | inter-network link |
| 121, 122 | wireless communication channel |
| 210-260 | phases of the process of FIG. 2 |
| 310-370 | structure of the device of FIG. 3 |
| 410-4100 | phases of the process of FIG. 4 |
| 510-530 | phases of the method of FIG. 5 |

CITATION LIST

[1] Wan, Z., Huang, K. and Chen, L., 2021. Secret Key Generation Scheme Based on Deep Learning in FDD MIMO Systems. IEICE Transactions on Information and Systems, 104(7), pp. 1058-1062
[2] Zhang, Xinwei, Guyue Li, Junqing Zhang, Aiqun Hu, Zongyue Hou, and Bin Xiao. "Deep Learning-based Physical-Layer Secret Key Generation for FDD Systems." arXiv preprint arXiv: 2105.08364 (2021)
[3] C. K. Anjinappa and I. Guvenc, "Angular and temporal correlation of V2X channels across sub-6 GHz and mmWave bands," *IEEE International Conference on Communications Workshops* (ICC Workshops), Kansas City, MO, 2018, pp. 1-6
[4] M. S. Sim, Y. Lim, S. H. Park, L. Dai and C. Chae, "Deep learning-based mmWave beam selection for 5G NR/6G with sub-6 GHz channel information: Algorithms and prototype validation," in *IEEE Access*, vol. 8, pp. 51634-51646, 2020

The invention claimed is:

1. An apparatus comprising at least one processing core and at least one memory storing instructions that, when executed by the at least one processing core, cause the apparatus at least to:
   determine a first channel definition describing a first wireless communication channel between the apparatus and a second apparatus, the first wireless communication channel being on a first frequency band;
   determine a second channel definition describing a second wireless communication channel between the apparatus and the second apparatus, the second wireless communication channel being on a second frequency band which has a lower bound at a higher frequency than an upper bound of the first frequency band; and
   derive an encryption key at least partly based on the second channel definition, and use the encryption key to encrypt information before it is transmitted to the second apparatus over the first wireless communication channel,
   wherein the upper bound of the first frequency band is less than six gigahertz, and the lower bound of the second frequency band is more than twenty-four gigahertz, and a center frequency of the second wireless communication channel is at least four times a center frequency of the first wireless communication channel, wherein the first channel definition and the second channel definition each define a channel frequency response, a channel impulse response, a channel state information, an angle of arrival, a direction of arrival, a time of arrival, and an angle of departure, wherein the apparatus comprises a first user equipment configured to communicate via sidelink with a second user equipment as the second apparatus, wherein the apparatus is configured to perform the determining of the second channel definition by deriving the second channel definition from the first channel definition using a predetermined correlation function employing location-based information, the predetermined correlation function mapping definitions of wireless communication channels in the first frequency band to definitions of wireless communication channels in the second frequency band, wherein the apparatus is configured to obtain a plurality of predetermined correlation functions based on prior measurements of the first user equipment and a base station, wherein the apparatus is configured to store the plurality of predetermined correlation functions and a mapping between the plurality of predetermined correlation functions and a location of the first user equipment and a location of the second user equipment, wherein the apparatus selects the predetermined correlation function based on the location of the first user equipment and the location of the second user equipment, wherein the channel frequency response of the second channel definition is derived at the first user equipment according to $\hat{H}_{110,2}=f(\hat{H}_{110,1})$, where f is a first predetermined correlation function, $\hat{H}_{110,1}$ is the channel frequency response of the first channel definition, and $\hat{H}_{110,2}$ is the channel frequency response of the second channel definition, wherein the channel frequency response of the second channel definition is derived at the second user equipment according to $\hat{H}_{120,2}=f(\hat{H}_{120,1})$, where g is a second predetermined correlation function, $\hat{H}_{120,1}$ is the channel frequency response of the first channel definition, and $\hat{H}_{120,2}$ is the channel frequency response of the second channel definition, wherein the channel frequency response of the second channel definition is a discrete Fourier transform of the channel impulse response of the second channel definition, wherein quantization is applied to the second channel definition after the channel frequency response of the second channel definition is derived from the first channel definition using the predetermined correlation function, and wherein the apparatus is configured to perform encrypting of the information at a physical layer of the first wireless communication channel.

* * * * *